United States Patent [19]

Stevens, Jr.

[11] Patent Number: 4,703,331

[45] Date of Patent: Oct. 27, 1987

[54] HIGH SPEED SPARK JET PRINTER

[75] Inventor: Gerald S. Stevens, Jr., Forest Hill, Md.

[73] Assignee: General Instrument Corp., New York, N.Y.

[21] Appl. No.: 802,969

[22] Filed: Nov. 29, 1985

[51] Int. Cl.$^4$ .......................... G01D 15/16; B41J 3/02; B32B 3/20

[52] U.S. Cl. ................................ 346/140 R; 400/120; 400/126; 428/188

[58] Field of Search ....... 346/140 PD, 76 PH, 139 C; 400/126, 120; 361/328, 329, 331; 428/188

[56] References Cited

U.S. PATENT DOCUMENTS

| | | | |
|---|---|---|---|
| 4,112,170 | 9/1978 | Rauscher | 428/188 |
| 4,238,807 | 12/1980 | Borio | 346/140 PD |
| 4,332,487 | 6/1982 | Borio | 346/140 PD |
| 4,349,829 | 9/1982 | Borio | 346/140 PD |
| 4,484,200 | 11/1984 | Tabata | 346/76 PH |
| 4,533,921 | 8/1985 | Golf | 346/139 C |
| 4,574,291 | 3/1986 | Wimmer | 346/140 PD |

OTHER PUBLICATIONS

IBM Tech. Disc. Bull., vol. 24, No. 10, Mar. 1982, pp. 5075-5077, Powell and Rasile, High Resolution Matrix Prints 1.

*Primary Examiner*—E. A. Goldberg
*Assistant Examiner*—Mark Reinhart
*Attorney, Agent, or Firm*—James & Franklin

[57] ABSTRACT

The print head includes a stationary block of non-conductive material having a plurality of openings into which spark jet capsules are received and a plurality of openings into which electrodes with off-set parts are received. Each electrode is located proximate the end of a different one of the capsules with the off-set part thereof situated in a channel on the block surface extending therebetween. The capsules are arranged in rows transverse to the direction of paper movement. The capsules in each of the rows are slightly off-set with respect to the corresponding capsules in the preceding row. The paper is moved continuously past the block. Actuation of the individual capsules is synchronized with the movement of the paper.

19 Claims, 7 Drawing Figures

HIGH SPEED SPARK JET PRINTER

The present invention relates to dot matrix printers and, more particularly, to a high speed non-impact printer including a stationary head carrying a plurality of spark jet capsules which are individually actuatable to perform high speed printing operations.

Printers of various types have been known and used for many different applications. One such application is the printing of tickets or receipts within various wagering systems such as on-track and off-track parimutuel betting and lotteries. Printers designed for this and other applications must be highly compact and, at the same time, capable of high speed operation. They may therefore be used at locations where space is at a premium and may handle transactions quickly and efficiently.

One type of printer which has been used in the past in ticket processors is known as an "impact" printer. An impact printer is designed to print a matrix of dots by causing the impact end of the print wire to be displaced toward an ink ribbon situated between the wire and the ticket. A plurality of such print wires, normally situated along a straight line extending transverse to the ticket movement, are often utilized. Each of the print wires is connected to an actuator. In the past, such actuators took the form of electrically actuatable solenoids. However, because of the weight, bulk, and cost of solenoids, same have recently been replaced, in many applications, by thin hammer-type actuators.

The hammer-type actuators normally comprise a stamped thin metal part having an opening into which a flat wire coil is mounted. The hammer actuators are mounted in a closely packed side-by-side manner, in cantilever fashion, between a pair of strong permanent magnets. Energization of the coil in a particular actuator causes the actuator, and thus the print wire attached thereto, to be displaced from its rest position toward the ticket, thereby to print a dot. By rapidly energizing the individual actuators and synchronizing same with the movement of the ticket, the appropriate indicia can be imprinted.

More recently, the above-described hammer-type actuators have been combined with a shuttle mechanism in order to achieve better graphical ability. In this case, the impact ends of the print wires are received within a wire bearing. The bearing is moved back and forth in a direction transverse to the direction of paper movement. Such a shuttle mechanism increases the quality of the printing because each impact wire is capable of imprinting dots at a number of different locations, depending upon the position of the movable wire bearing when the actuator to which the impact wire is mounted is energized.

However, even the most sophisticated of the above-described impact printers have distinct disadvantages. The disadvantages are an inevitable result of the fact that such printers include a large number of mechanical moving parts which require high manufacturing tolerances, precise alignment, and which tend to wear out over time. In particular, the wearing of the impact ends of the print wires tends to result in incomplete dots being imprinted and, as a consequence, the quality of the printing deteriorates over time.

Recent developments in non-impact printing have resulted in dot matrix printers of commercial quality. Such non-impact printers eliminate some of the problems associated with impact printers because they require no displaceable actuators within the print head. Consequently, high manufacturing tolerances are no longer required and precise alignment of mechanically moving hammers no longer necessary. However, the non-impact printing devices have certain disadvantages associated with them also. These disadvantages, as outlined below, are eliminated to a great extent by the present invention which relates to a high speed non-impact printer.

The non-impact printing device of the type here under discussion is described in detail in U.S. Pat. No. 4,238,807 issued Dec. 9, 1980 to Michelle Bovio, et al. entitled "Non-Impact Printing Device" and in various other U.S. and foreign patents. This device produces printed dots from a stick of solid ink contained within a cartridge or capsule by producing a spark at the forward end of the ink supply within the capsule. The spark apparently erodes ink particles from the ink supply and creates a force which impels the eroded ink particles onto a sheet of paper to produce a dot thereon. There are no moving parts and the paper is not mechanically impacted.

The ink is provided in the form of a solid stick contained within the capsule. The stick terminates short of the nozzle end of the capsule. The nozzle end has a shaped aperture through which the eroded particle passes on its way to the paper. The spark is formed between the ink stick itself, which is electrically conductive, and connected to one pole of a potential producing circuit, and a second electrode connected to the other pole of the circuit and located outside the capsule end, but proximate thereto. In some embodiments, the second electrode is located on the other side of the paper from the capsule. In other embodiments, it is located between the paper and the nozzle end of the capsule.

Such spark jet print capsules have been incorporated in serial dot printers, as described in U.S. Pat. No. 4,349,829 issued Sept. 14, 1980 to Michelle Bovio, et al. and entitled "Non-Impact Printing Method". In this case, a line of spark jet print capsules are mounted on a carriage movable transversely with respect to the paper in a reciprocating motion. This device is somewhat similar to the shuttle impact type printers described above in that it incorporates moving parts, thereby introducing the adverse effects of inertia. Because only a single line of spark jet print capsules is utilized, the print speed and quality are limited. Moreover, the print capsule, which has limited ink capacity, must be replaced frequently.

In general, the high speed spark jet printer of the present invention overcomes the above disadvantages through the use of a stationary head which carries a large number of spark jet print capsules arranged in a densely packed matrix array, thereby eliminating the necessity for shuttling a single capsule across the paper. Hence, all of the moving parts are eliminated. The result is a non-impact printer which can operate at very high speed and produce excellent print quality. At the same time, the printer of the present invention is quite compact and relatively inexpensive to manufacture.

It is, therefore, a prime object of the present invention to provide a non-impact printer which can operate at high speed with excellent print quality.

It is another object of the present invention to provide a high speed non-impact printer which incorporates a plurality of spark jet capsules into a print head with no moving parts.

It is another object of the present invention to provide a high speed spark jet printer including a head formed of a plastic block which is light in weight and inexpensive to manufacture.

It is another object of the present invention to provide a high speed spark jet printer in which a large number of print capsules are arranged in a matrix array consisting of slightly off-set successive rows.

It is another object of the present invention to provide a high speed spark jet printer in which the paper is continuously moved during the print process to increase print speed.

It is another object of the present invention to provide a high speed spark jet printer in which a large number of spark jet capsules are utilized in order to lengthen the capsule replacement intervals.

In accordance with one aspect of the present invention, a stationary head for a spark jet printer is provided. The head comprises a block of non-conductive material having a plurality of spark jet capsule receiving openings. The spark jet capsule receiving openings are arranged in rows extending in a direction substantially transverse to the direction of paper movement. The capsule receiving openings in each of the rows is slightly off-set with respect to the corresponding capsule receiving openings in the preceding row. Electrode receiving openings are situated within the block proximate to each of the capsule receiving openings. Channels in the surface of the block proximate the receiving openings and the capsule receiving opening proximate thereto. Means are provided for continuously moving the paper relative to the block during the printing operation.

The capsule receiving openings extend from the paper facing surface of the block to the rear surface thereof. A conductive "common" plate is affixed to the rear surface of the block and aligned with each of the capsule receiving openings.

Each of the electrode receiving openings extends from the surface of the block proximate the paper to the rear surface of the block. The plate includes lead receiving openings which are aligned with each of the electrode receiving openings such that lead wires may extend from the electrodes, through the block and plate attached thereto.

The channels extend across the paper facing surface in substantially parallel planes. These planes are inclined with respect to the direction of paper movement.

The direction of paper movement may be reversed between printing operations. This permits paper to be conserved.

The block comprises first and second sections divided along a plane substantially parallel to the surface of the block proximate the paper. Means are provided for joining the sections. This permits the spark jet capsules to be inserted within the block during assembly.

In accordance with another aspect of the present invention, a spark jet printer is provided including a plurality of spark jet capsules, a plurality of electrodes, each having an off-set part, and a block of non-conductive material. The block has a plurality of openings adapted to receive the capsules therein and a plurality of openings adapted to receive the electrodes therein. Each of the electrode receiving openings is situated proximate a different one of the capsule receiving openings. The capsule receiving openings are arranged in rows extending in a direction substantially transverse to the direction of paper movement. The capsules in each of the rows are slightly off-set with respect to the corresponding capsules in the preceding row. Channels in the surface of the block proximate the paper extend between each of the electrode receiving openings and the capsule receiving opening proximate thereto. These channels are adapted to receive the off-set parts of the electrodes therein such that each of the off-set parts are situated adjacent a different one of the capsule ends. Means are provided for continuously moving the paper relative to the surface of the block proximate the paper during the printing operation.

The printer further comprises a plurality of leads. Each of the leads extends from a different one of the electrodes, through the electrode receiving opening in which the electrode is received, and through the lead receiving opening aligned therewith in the plate affixed to the rear surface of the block.

A source of potential is provided having first and second outputs. Means are provided for operably electrically connecting one of the outputs to the plate. Means are provided for electrically operatively connecting the other of the outputs to selected ones of the electrode leads.

The source is preferably a pulsed high voltage source. Means are provided for synchronizing the pulsing of the source with the operation of the paper moving means.

The paper moving means comprises a drive roller. The synchronizing means comprises a strobe disc mounted for movement with the drive roller and photoelectric signal generating means cooperating with the disc and operably electrically connected to the pulsed source.

To these and to such other objects which may hereinafter appear, the present invention relates to a high speed spark jet printer, as described in detail in the following specification and recited in the annexed claims. taken together with the accompanying drawings, wherein like numerals refer to like parts and in which:

Figure 1:
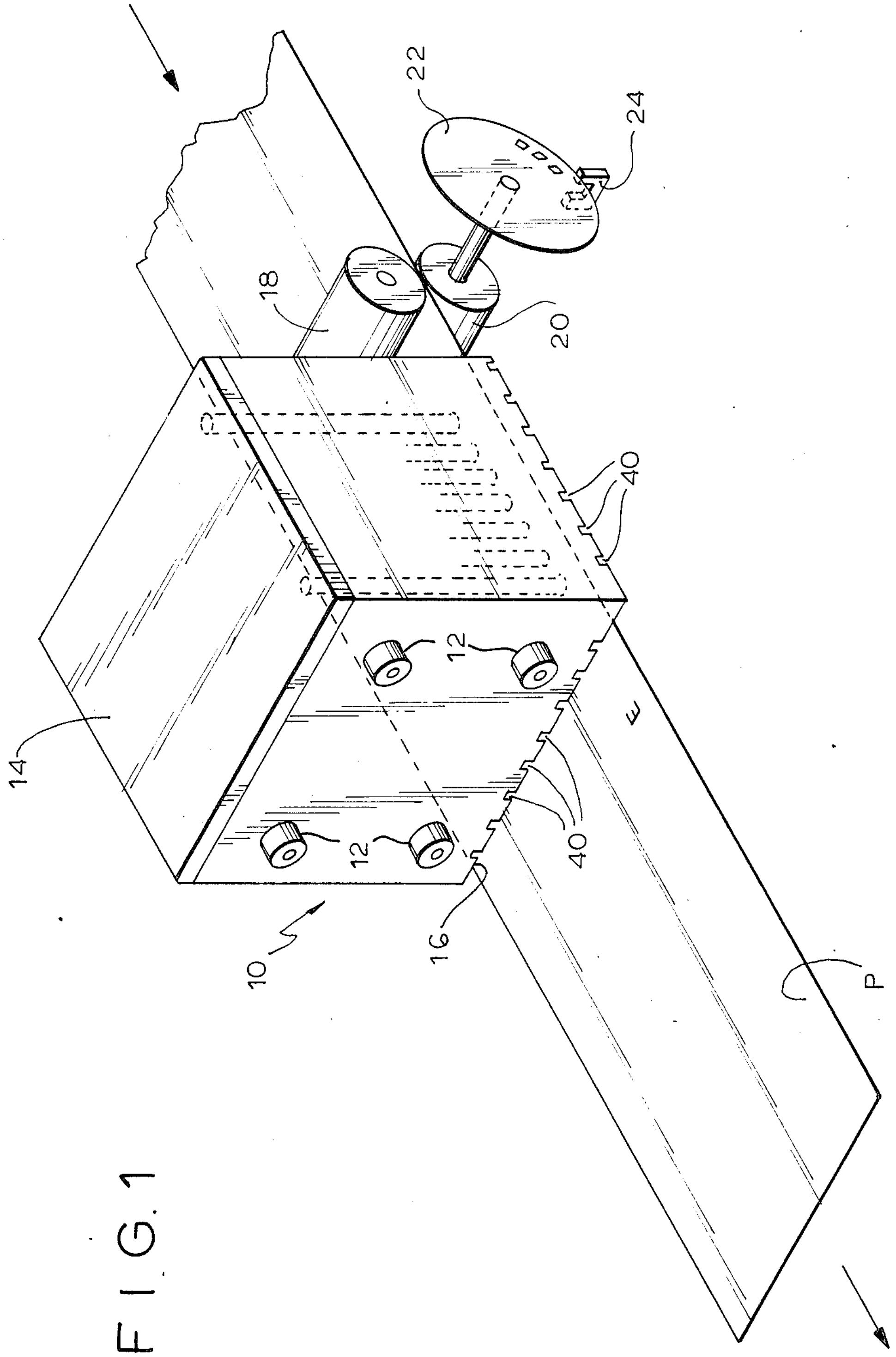
FIG. 1 is an isometric view of the print head portion and paper drive of the present invention.
Figure 3:
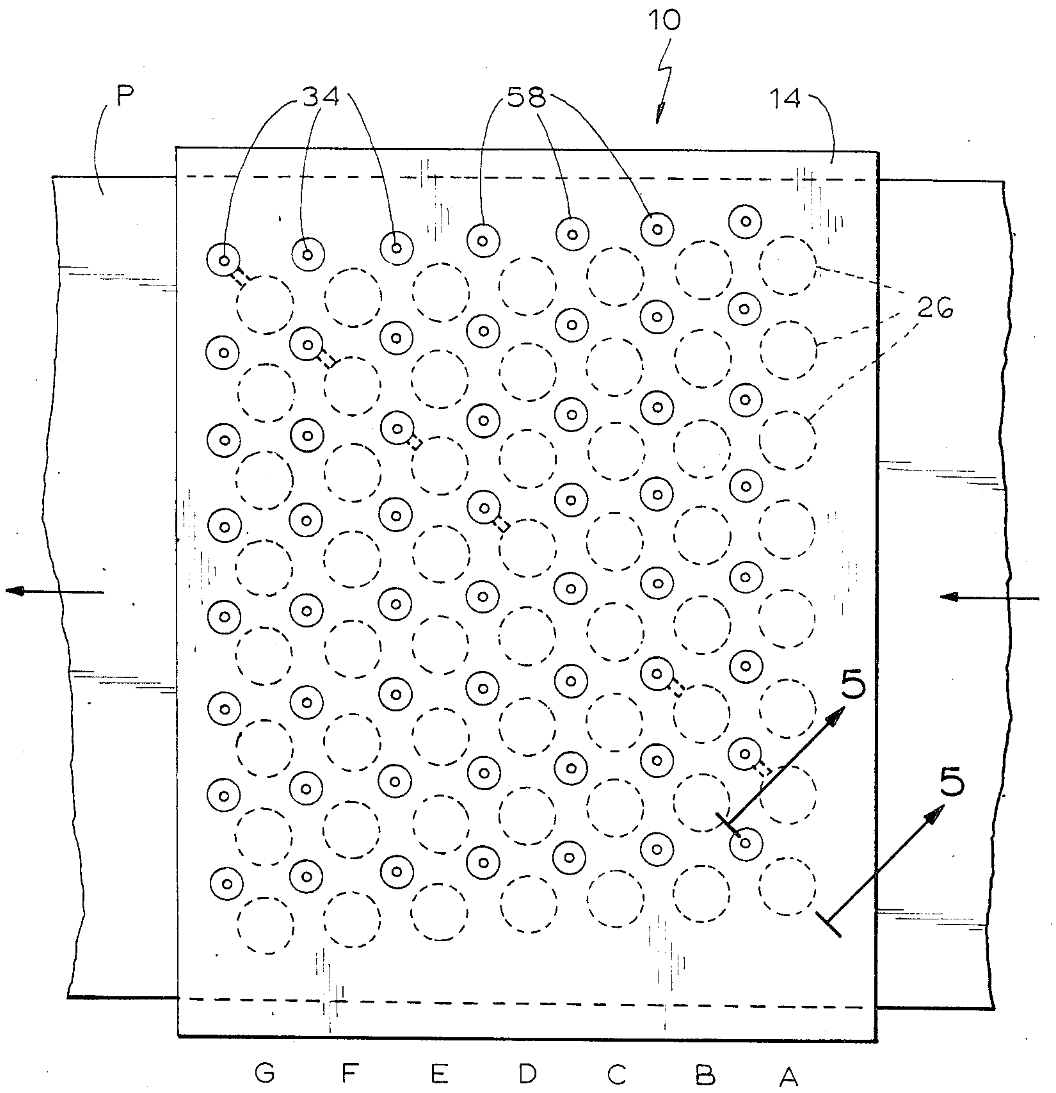
FIG. 3 is a rear elevational view of the print head of the present invention.
Figure 4:
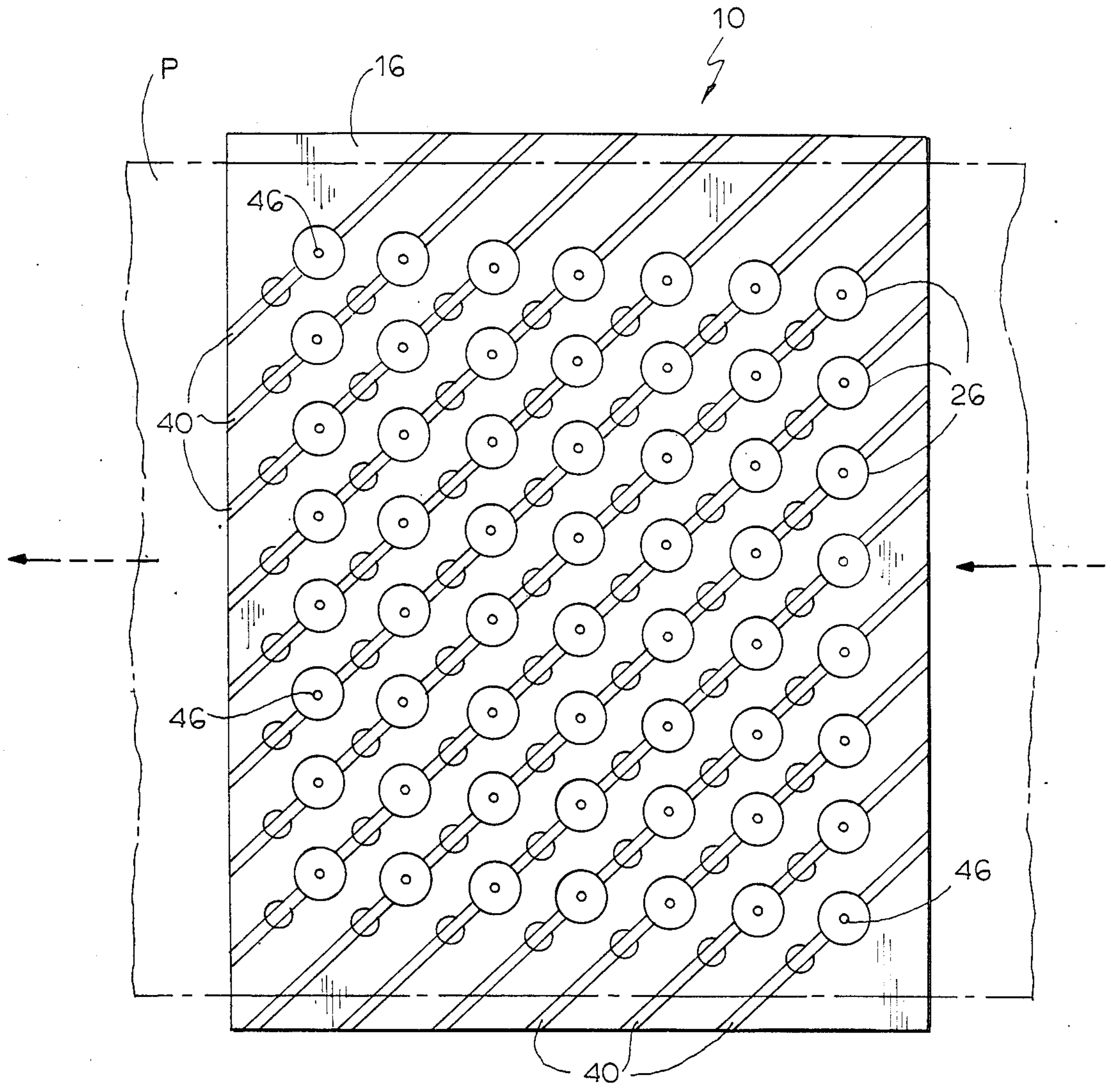
FIG. 4 is a front elevational view of the print head of the present invention, with the print capsules and electrodes mounted therein.

As seen in FIGS. 1, 3, and 4, the print head of the printer of the present invention consists of a stationary block, generally designated 10, preferably in the form of a cube having approximately 2-inch sides. Block 10 is preferably solid and composed of electrically non-conductive material, such as molded plastic. Block 10 is suspended in a fixed position from a frame (not shown)

by a plurality of protrusions 12 or other conventional mounting means.

Block 10 has a rear or top surface to which a conductive plate 14, as best seen in FIG. 3, is mounted. The opposite surface 16, as best seen in FIG. 4, is the print surface. Located proximate to print surface 16, resting on a platen or the like (not shown), is a strip of paper P which is moved relative to block 10 in the direction indicated by the arrows in FIGS. 1, 3, and 4. Paper P is moved between a pressure roller 18 and a drive roller 20, the latter of which carries a synchronization mechanism. This mechanism includes a strobe disc 22 which cooperates with a photoelectric signal generating element 24, of conventional design.

Figure 5:
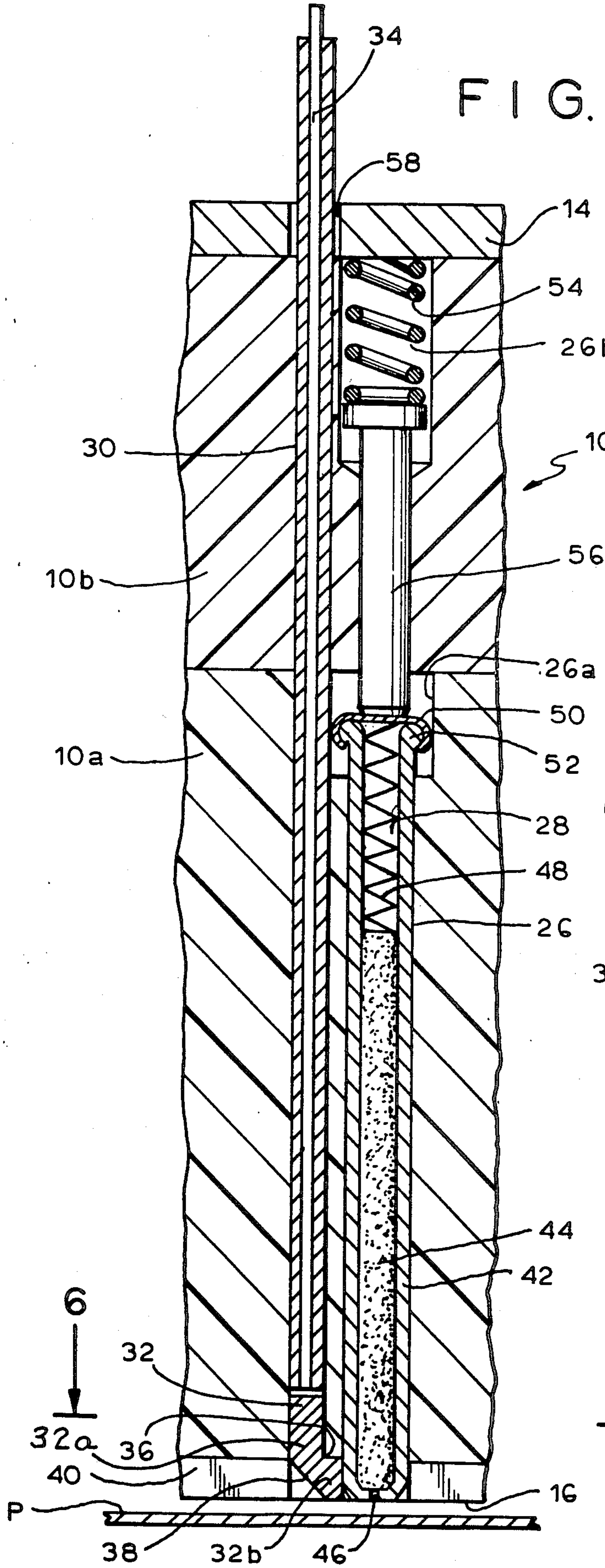
FIG. 5 is a cross-sectional view of a section of the print head of the present invention taken along line 5—5 of FIG. 3.
Figure 6:
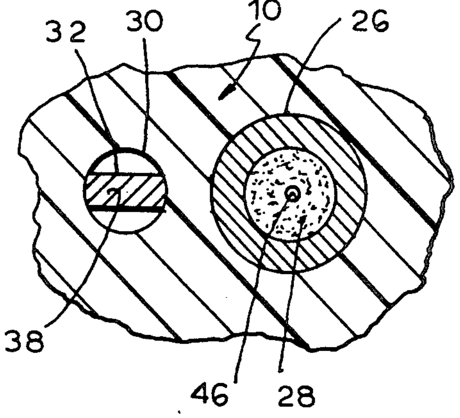
FIG. 6 is a cross-sectional view of a portion of the print head of the present invention, taken along line 6—6 of FIG. 5.

Block 10 is provided therein with two sets of openings in the form of generally cylindrical channels which extend from surface 16 to the rear surface. The first set of openings 26 are designed to receive solid ink spark jet capsules 28, of conventional design, as illustrated in FIG. 5. The second set of openings 30 are designed to receive, at their forward ends, electrodes 32 which have insulated leads 34 extending therefrom, as illustrated in FIG. 5.

As best seen in FIGS. 3 and 4, openings 26 are arranged in rows of eight openings each. The rows extend in a direction substantially transverse to the direction of paper movement. Openings 26 in each row are slightly off-set with respect to the corresponding openings 26 in the preceding row, for reasons explained below.

As best seen in FIG. 5, each electrode 32 has a body part 32*a*, which is generally rectangular in shape, and an off-set part 32*b* which extends from body part 32*a* to a point off-set from the axis of body part 32*a* so as to form a generally rectangular shoulder 36 and an inclined forward surface 38.

As best seen in FIG. 4, surface 16 is provided with a plurality of generally parallel grooves or channels 40. Channels 40 extend across surface 16 in a direction which is at approximately a 45° incline with respect to the direction of paper movement. As best seen in FIG. 5, channels 40 form recesses into which the off-set parts 32*b* of electrodes 32 are received such that they can extend from openings 30 to the adjacent openings 26, below surface 16. This permits a portion of each electrode 32 to be adjacent the forward or nozzle end of the print capsule 28 located proximate thereto.

As best seen in FIG. 5, each of the spark jet capsules 28 includes a generally cylindrical non-conductive casing 42 within which is mounted a rod of conductive solid ink 44. Casing 42 has a tapered forward nozzle end with an ejection opening 46 through which ink particles may pass. Rod 44 is urged towards the forward tapered end of capsule 42 by a compression spring 48 made of conductive material. The rear of capsule 42 has a metallic end cap 50 crimped around an outwardly facing flange 52.

Capsule 28 is wholly mounted within a first or forward section 10*a* of block 10. Block 10 also includes a second or rear section lO*b* which is affixed thereto after the capsules are inserted into openings 26. It should be noted that the rear or top section of opening 26, labelled 26*a*, has a slightly enlarged diameter so as to accommodate cap 50. Opening 26 extends through section 10*b* and includes a rear or upper section 26*b* which roughly has the same enlarged diameter as section 26*a*. Section 26*b* receives a conductive compression spring 54 which extends between common plate 14 and a conductive piston 56 such that an electrical connection is made between common plate 14 through spring 54, through piston 56, through end cap 50, and spring 48 to the solid ink rod 44.

Block 10 is made in two sections such that capsules 44 may be inserted within openings 26 in section 10*a* and spring-loaded rods 56 may be inserted within openings 26 in section lO*b*. Common plate 14, block 10*b* and block lO*a* are then assembled together by common hardware means. After the capsules are properly situated, electrodes 32 are situated in the forward ends of openings 30 with leads 34 extending along the openings 30 and through aligned openings 58 in common plate 14.

Figure 2:
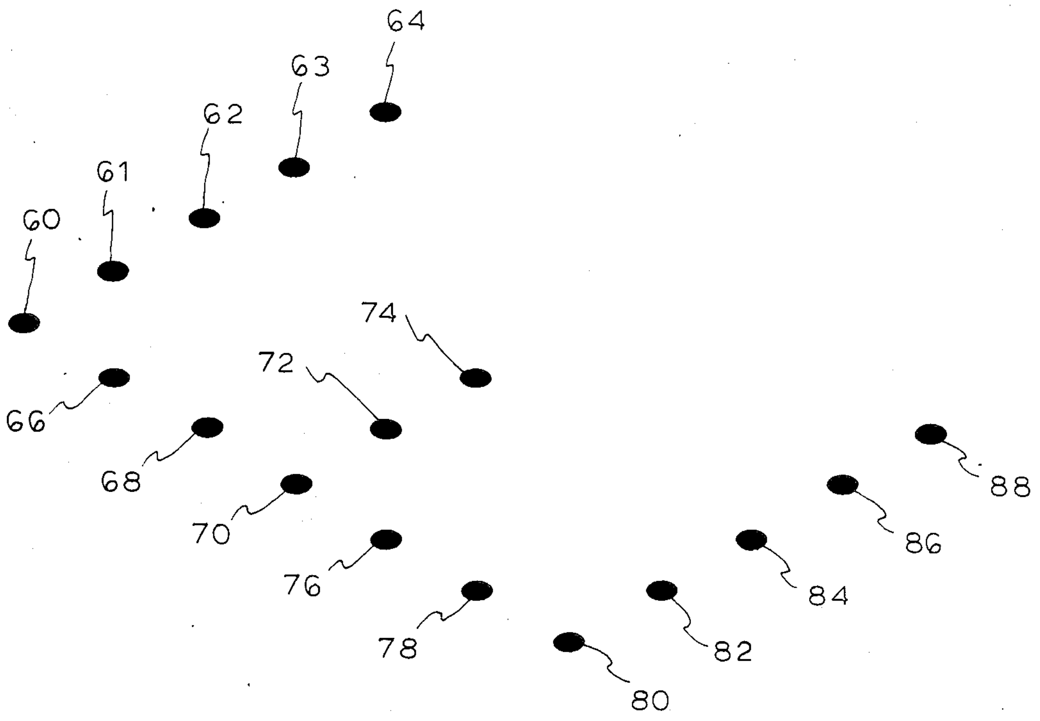
FIG. 2 is a greatly enlarged view of an indicia in the form of a letter "E" imprinted by the printer of the present invention.

Referring to FIG. 2, the reason for offsetting the rows of capsule receiving openings 26 will be explained. FIG. 2 is a greatly enlarged view of a capital letter "E" as it would be imprinted by the rightmost capsule 28 in each of the successive rows, here labelled A, B, C, D, E, F, G on FIG. 3 for easy reference, As illustrated in FIG. 2, the "E" is actually made up of a number of dots labelled 60 through 88.

Initially, capsule A is actuated to print dot 60. The paper is advanced one dot pitch allowing capsule A to print dot 61. Further paper advance allows capsule A to print dot 62, then dot 63, and then dot 64. Paper is further advanced until dot 60 is adjacent to capsule B, at which time dot 66 is printed by capsule B. Paper is further advanced until dots 60 and 66 are adjacent to capsule C, at which time dot 68 is printed by capsule C. Paper is further advanced until dots 60, 66 and 68 are adjacent to capsule D, at which time dot 70 is printed by capsule D. Then capsule D prints dot 72 and dot 74 in the next print positions. Paper is further advanced until dots 60, 66, 68 and 70 are adjacent to capsule E, at which time dot 76 is printed by capsule E. Paper is further advanced until dots 60, 66, 68, 70 and 76 are adjacent to capsule F, at which time dot 78 is printed by capsule F. Paper is further advanced until dots 60, 66, 68, 70, 76 and 78 are adjacent to capsule G and, lastly, capsule G is actuated five times in succession to print dots 80, 82, 84, 86 and 88. It should be borne in mind that during this entire process, paper P is being continuously moved in a direction of the arrows and a small time interval takes place between the successive actuations of the capsule sets.

Figure 7:
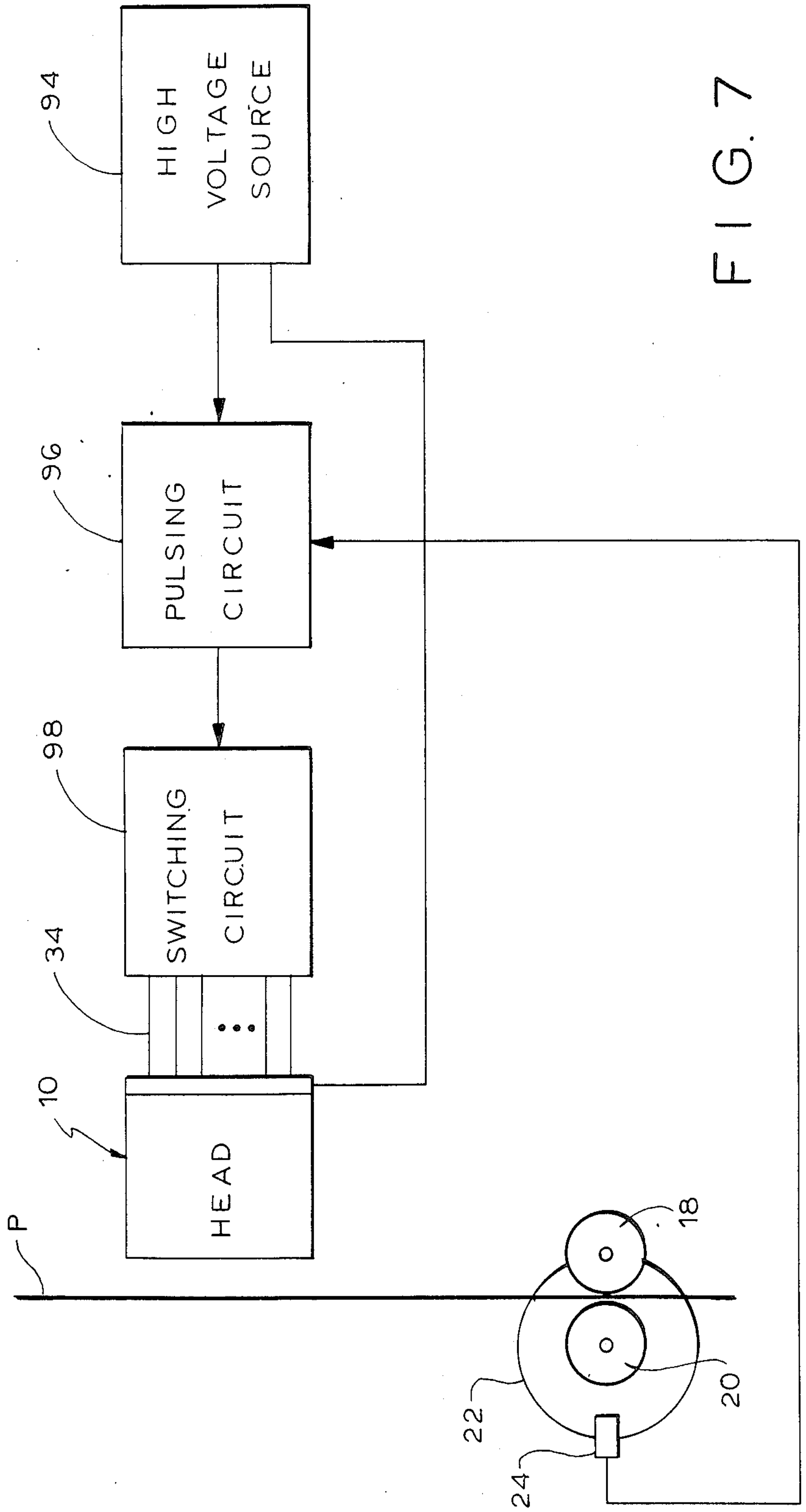
FIG. 7 is a block diagram illustrating the energization circuitry for the high speed spark jet printer of the present invention.

FIG. 7 shows, in block diagram form, the manner in which the actuation of the print capsules is synchronized with the movement of the paper. In order to actuate each capsule 28, a high potential must be applied between the ink rod 44 therein and the electrode 32 proximate the end of the capsule. This potential is supplied by a high voltage source 94 of conventional design. Source 94 has a positive pole and a negative pole, one of which is directly connected to conductive "common" plate 14 affixed to the rear surface of block 10 and in electrical contact with each of the capsules 28 mounted therein. The other pole of source 94 forms one of the inputs to a pulsing circuit 96 The other input to pulsing circuit 96 is the signal generated by photoelectric signal generating means 24 located, as illustrated in FIG. 1, adjacent strobe disc 22 which is mounted for movement with the drive roller 20. The signal output of generator 24 controls pulsing circuit 96 to provide a high voltage pulsed output to a switching circuit 98. Switching circuit 98 has a plurality of outputs, one for each electrode 32 which are connected thereto by insulated wire leads 34. Circuit 98 consists of a plurality of electronic switches of conventional design which open and close as necessary to connect selected electrodes 32 to the output of pulsing circuit 96 and thereby actuate selected capsules 28 to imprint dots in the proper locations on paper P to form the desired indicia.

Commonly, paper strip P, after it is imprinted with the desired indicia, is cut into tickets or receipts. In order to conserve paper, the direction of paper movement may be reversed after each printing operation, if desired. This is simply accomplished by using a bidirectional motor or gearing to power drive roller 20. Conventional synchronizing means can be utilized to cause the bidirectional motor to change direction at the appropriate times.

It will now be appreciated that the present invention relates to a non-impact printer which can perform quality printing at a very high speed. The printer includes a print head block which contains a plurality of spark jet capsules arranged in slightly off-set rows. This arrangement provides an effect similar to that of a shuttle printer. This structure permits the paper to be continuously moved for faster printing. A large number of capsules are utilized so as to lengthen capsule replacement intervals.

While only a single preferred embodiment of the present invention has been disclosed herein for purposes of illustration. it is obvious that many variations and modifications could be made thereto. It is intended to cover all of these variations and modifications which fall within the scope of the present invention, as defined by the following claims:

I claim:

1. A stationary head for a spark jet printer adapted to print on paper associated therewith, said head comprising a block of non-conductive material having a surface adapted to be proximate said paper and having a plurality of spark jet capsule receiving openings arranged in rows, said rows extending in a direction substantially transverse to the direction of paper movement, a plurality of electrode receiving openings, each of said electrode receiving openings being proximate a different one of said capsule receiving openings, and channels in the surface of said block proximate the paper extending between each of said electrode receiving openings and said capsule receiving opening proximate thereto.

2. The head of claim 1, wherein said capsule receiving openings in each of said rows are slightly offset with respect to the corresponding capsule receiving openings in the preceding row.

3. The head of claim 1, further comprising means for continuously moving the paper relative to said block during the printing operation.

4. The head of claim 1, wherein said capsule receiving openings extend from said surface of said block proximate the paper to the rear surface thereof and further comprising a conductive plate affixed to said rear surface of said block and aligned with each of said capsule receiving openings.

5. The head of claim 4, wherein each of said electrode receiving openings extends from said surface of said block proximate the paper to said rear surface of said block and wherein said plate comprises a plurality of lead receiving openings aligned with different ones of said electrode receiving openings.

6. The head of claim 1, wherein said channels extend across said surface of said block proximate the paper in substantially parallel planes inclined with respect to the direction of paper movement.

7. The head of claim 1, wherein said block comprises first and second sections divided along a plane substantially parallel to said surface of said block proximate the paper and means for joining said sections.

8. A spark jet printer comprising means for feeding a paper to be printed upon, a plurality of spark jet capsules, a plurality of electrodes, each of said electrodes having an offset part, a block of non-conductive material having a surface adapted to be proximate said paper and having a plurality of spaced openings adapted to receive different ones of said capsules therein and a plurality of spaced openings adapted to receive different ones of said electrodes therein, each of said electrode receiving openings being situated proximate to a different one of said capsule receiving openings, said capsule receiving openings being arranged in rows, said rows extending in a direction substantially transverse to the direction of paper movement, channels in the surface of said block proximate the paper, extending between each of said electrode receiving openings and the capsule receiving openings proximate thereto and adapted to receive said offset parts therein, such that each of said offset parts are situated adjacent a different one of said capsules.

9. The printer of claim 8, wherein said capsule receiving openings in each of said rows are slightly offset with respect to the corresponding capsule receiving openings in the preceding row.

10. The printer of claim 8, further comprising means for continuously moving the paper relative to said block during the printing operation.

11. The printer of claim 8, wherein said capsule receiving openings extend from said surface of said block proximate the paper to the rear surface thereof and further comprising a conductive plate affixed to said rear surface of said block and aligned with each of said capsule receiving openings.

12. The printer of claim 11, wherein each of said electrode receiving openings extends from said surface of said block proximate the paper to said rear surface and wherein said plate has lead receiving openings aligned with each of said electrode receiving openings.

13. The printer of claim 12, further comprising a plurality of leads, each of said leads extending from a different one of said electrodes, through said electrode receiving openings in which the electrode is received and through said lead receiving openings in said plate aligned therewith.

14. The printer of claim 13, further comprising a source of potential having first and second outputs, means for operably electrically connecting one of said outputs to said plate, and means for operably electrically connecting said other of said outputs to selected ones of said leads.

15. The printer of claim 14, wherein said source is a pulsed high voltage source, and further comprising means for synchronizing the pulsing of said source with the operation of said paper moving means.

16. The printer of claim 15, wherein said paper moving means comprises a drive roller and wherein said synchronizing means comprises a strobe disc mounted for movement with said drive roller and photoelectric signal generating means cooperating with said disc and operably electrically connected to said pulsed source.

17. The printer of claim 8, wherein said channels extend across said surface of said block proximate the paper in substantially parallel planes inclined with respect to the direction of paper movement.

18. The printer of claim 8, wherein the direction of paper movement is reversed between printing operations.

19. The printer of claim 8, wherein said block comprises first and second sections divided along a plane substantially parallel to said surface proximate the paper and means for joining said sections.

* * * * *